June 21, 1960 A. PRILL ET AL 2,941,901
MAGNETIC IMPULSE RECORD CARRIERS
Filed July 3, 1956
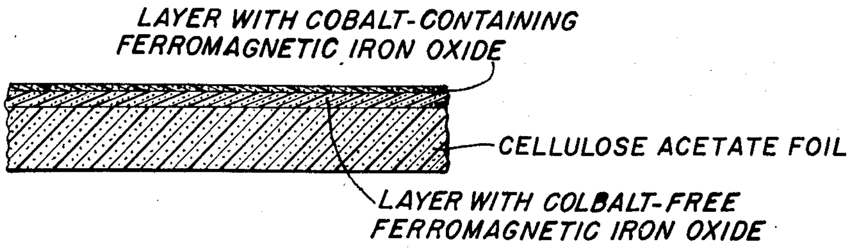
INVENTORS:
ALPHONS PRILL
and ROLF BRÜCK
BY Connolly and Hutz
THEIR ATTORNEYS 2,941,901
Patented June 21, 1960

2,941,901

MAGNETIC IMPULSE RECORD CARRIERS

Alphons Prill and Rolf Brück, Leverkusen-Bayerwerk, Germany, assignors to Agfa Aktiengesellschaft Filed July 3, 1956, Ser. No. 595,622

Claims priority, application Germany July 8, 1955

5 Claims. (Cl. 117—76)

The present invention relates to new magnetic impulse record carriers and more especially to magnetic impulse record carriers the recording layer of which essentially consists of a non-magnetizable plastic binder in which is embedded a ferromagnetic powder.

A large number of magnetizable substances for the production of magnetic sound record tapes have already been proposed in the literature. Mainly, however, it has been the magnetite ($Fe_3O_4$) and the $\gamma$-ferric oxide which has been used. A considerable technical advance was produced by cobalt-containing magnetic iron oxides, which show a remanence 50 percent higher than the former oxides. By this means, the tapes were given a particularly high reproducing level.

It has now been observed that such tapes having iron oxides with a high remanence show a certain degree of instability. With frequent reproduction of a recorded sound, the reproducing volume may drop in the extreme case by about 1–2 db. On the other hand, tapes which were produced from iron oxides with lower remanence showed no or only a very slight decrease in the reproduction volume.

The single figure of the drawing illustrates one embodiment of the invention.

It has now been found that a high reproduction volume of the tape and also very good stability can be obtained if two iron oxides are used in the magnetic sound record carrier, one of said oxides being characterized by a particularly high remanence and the other by good stability.

It is most effective if the highly remanent iron oxide is applied in the lowermost layer to the support and the more stable iron oxide is applied in an outer layer. An outer layer with a thickness of about 4–6$\mu$ and containing a stable iron oxide yields the most favorable values in every respect (amount of stable iron oxide about 5–10 g. per square metre, amount of the highly remanent iron oxide about 25–15 g. per square metre).

An arrangement which is more simple in practice can, however, be used, this consisting in that the two iron oxides are applied jointly in one layer, so that in this way both good stability and a high sensitivity of the tape are obtained. Particularly favorable tape properties are obtained if about equal parts by weight of each oxide are used.

Among the iron oxides with particularly high remanence it is preferred to use an iron oxide containing cobalt, preferably in a quantity amounting to 2.5 to 4 atomic percent as calculated on the total amount of metals of said oxides. In other words, 2.5–4 percent of the iron atoms of the iron oxide are replaced by cobalt. These oxides have remanence values of about 450 to 650 gausses and coercivity values of about 250 to 420 oersteds.

These oxides, which are non-sintered, are prepared by dissolving a water soluble salt of iron and a water soluble salt of cobalt in an aqueous solution, co-precipitating from said solution hydroxides of said metals, treating said co-precipitated hydroxides in an aqueous medium with an alkaline agent, whereby said hydroxides are transformed into ferromagnetic iron oxides containing cobalt, separating said oxides from said aqueous medium and, if necessary, heating the dried oxides in an oxidizing gaseous medium as for instance air, to a temperature not surpassing 500° C., preferably to 200–350° C. In carrying out this reaction the cobalt compounds are used in such quantities that the oxides obtained contain 2.5–4 atomic percent of cobalt.

Especially valuable oxides are obtained when using such conditions for the precipitation of the hydroxides, that the precipitated hydroxides contain 1–20, preferably 5–15 atomic percent of the iron in trivalent, the rest in divalent form.

As iron and cobalt salts for carrying out the above reaction there can be used inorganic as well as organic salts such as sulfates, chlorides, nitrates, acetates. The most suitable salts are the iron and cobalt sulfates. As cobalt salts there are preferably applied such salts in which the cobalt is divalent, although there can also be used salts of trivalent cobalt, such as cobalt-complex salts, from the aqueous solutions of which cobalt hydroxides can be precipitated by means of hydroxides of alkaline metals.

For precipitating the hydroxides from the aqueous solutions of iron and cobalt salts there may be used the hydroxides of the alkali and alkaline earth metals, e.g. sodium hydroxide, potassium hydroxide and calcium hydroxide. Ammonia can also be used. The most suitable precipitating agents are the hydroxides of the alkali metals.

The co-precipitation of the hydroxides is preferably carried out at temperatures of about 5–30° C., although also lower or higher temperatures may be used.

Suitable oxidizing agents for carrying out the above process are for instance nitrates, such as potassium-, sodium-, ammonium-nitrate, water soluble chlorates, such as sodium chlorate, persulfates such as potassium persulfate, $H_2O_2$, oxygen. The oxidation of the coprecipitated material is preferably carried out at elevated temperatures lying between about 50° C. and the boiling point of the solution. Temperatures of about 65–90° C. are most suitable.

The ferro-magnetic oxides obtained by treating the co-precipitated hydroxides in the aqueous medium most probably correspond to the formula $FeO.Fe_2O_3$ (magnetite) in which 2.5–4 atomic percent of iron are substituted by cobalt, whereas the oxides obtained by treating said compounds in an oxidizing gaseous medium most probably correspond to the formula $\gamma$-$Fe_2O_3$, in which 2.5–4 atomic percent of iron are substituted by cobalt.

This process is illustrated by the following example:

*Example 1*

To a solution of 7 mols NaOH and 0.04 mol $NaClO_3$ in 6 litres of water which is kept under nitrogen there is quickly added at room-temperature (22° C.) a solution of 2.895 mols of $FeSO_4.7H_2O$ and 0.105 mol of $CoSO_4.7H_2O$ in 3 litres of water. The precipitate of hydroxides formed contains 3 mols of metal atoms of which 3.5 atomic percent are cobalt and 8 atomic percent are trivalent iron. The suspension is heated under nitrogen to 80° C. and mixed with 1 mol of $NaNO_3$ in 0.3 litre of water. The mixture is kept while stirring for 80 minutes at 80° C. and at least heated to the boil for 60 minutes. The precipitate is decanted four times with water, sucked off and dried at 100° C. The dried black precipitate is oxidized by heating it under a stream of air to 280° C. After 6 hours the black precipitate is transformed into a greyish brown oxide corresponding approximately to the formula $Me_2O_3$, in which M stands for iron and cobalt. This oxide (in the following designated as pigment A) has the following magnetic values: remanence=550 gausses, coercive force=370 oersteds. These values are found by the following method:

The oxide powder is filled into a glass tube of 20 cm. length and 7 mm. inner width. This tube is magnetized in lengthwise direction until saturation is reached and the magnetization is measured after removal of the magnetizing sorce. The value found is divided by the specific weight in g./cm.$^3$ of the powder as present in the tube. The resultant value of remanence $B_R$ is therefore independent of the amount of iron oxide present in the tube. The coercive force $H_E$ is the magnetic force which is required to completely demagnetize the sample which had been magnetized beforehand to full saturation, that is to say the sample is completely unmagnetic after switching off the demagnetizing field.

As ferromagnetic oxides of high stability there are ferromagnetic iron oxides which are free of cobalt. An example of such iron oxides is the $\gamma.Fe_2O_3$ the crystals of which have the shape of a needle and which is obtained from $\alpha$- or $\gamma$-Fe(III)-hydroxyde (FeOOH) by reducing it to $Fe_3O_4$ and oxidizing the latter to $\gamma$-$Fe_2O_3$. A further example is the magnetite ($Fe_3O_4$) which is obtained by oxidizing a precipitate of $Fe(OH)_2$ in an aqueous medium with $KNO_3$ at elevated temperature. Preferably the $Fe_3O_4$ is oxidized in known manner to $\gamma.Fe_2O_3$.

The following examples illustrate these processes:

*Example 2*

To a solution of 11.5 mols of $FeSO_4$ in 12 litres of water there are added 6 mols of NaOH thereby precipitating the iron ions as $Fe(OH)_2$. The suspension is diluted with water to a volume of 36 litres. After addition of 4 kg. of iron scrap the suspension was heated to 60° C. and air was passed through it while stirring for 120 hours. The iron oxydehydrate formed is decanted several times with water, thereafter sucked off and dried. The FeOOH is heated for 2 hours to 350° C. and thereby transformed to $Fe_2O_3$. The latter is reduced at the same temperature by means of illuminating gas to $Fe_3O_4$. After cooling to a temperature of 200° C. in a nitrogen atmosphere the magnetite is slowly oxidized to $\gamma$-$Fe_2O_3$ within 1 hour by passing air over it. This iron oxide, which is in the following designated as pigment B, has the following magnetic characteristics: $B_R$=406 gausses, $H_E$=320 oersteds.

*Example 3*

$Fe(OH)_2$ was precipitated from a solution of 10 mols of $FeSO_4$ in 30 l. of $H_2O$ by addition of 21 mols of NaOH. The suspension was heated to 80° C. and 3 mols of $NaNO_3$ were added. After 1 hour the suspension was boiled for 1 hour. The $Fe_3O_4$ formed was decanted 6 times, sucked off, washed once more and dried. It was thereafter heated to 260° C. in an air current for 6 hours and thereby transformed into $\gamma$-$Fe_2O_3$ (designated pigment C). The magnetic characteristics were the following: $B_R$=373 gausses, $H_E$=200 oersteds.

The magnetic impulse record carriers may be produced according to known methods. For instance, the magnetizable oxides may be finely dispersed in a coating composition such as a lacquer, and applied to the surface of a preferably non-magnetic supporting member, such as a wire, a disc, a fiber, a tape, a foil, by means of a fountain roll, by immersion, by casting, by spraying, by means of brushes or by any other convenient method. The coating composition contains a non-magnetic binder such as a cellulosic derivative, as for instance nitrocellulose, a high molecular polyamide, polymers and copolymers of acrylic acid and methacrylic acid, alkyl esters, such as methyl, ethyl butylesters, copolymers of vinylchloride and vinylacetate of any other synthetic thermoplastic film-forming plastics, or a gum or a natural resin. It is also possible to disperse the oxides in solutions of such compounds as are transformed into a film-forming binding agent after evaporation of the solvent. Such compounds are for instance the polyisocyanates and organic compounds that contain at least two reactive hydrogen atoms, such as polyhydric alcohols, or polyesters with hydroxyl end groups, which after evaporation of the solvent and if necessary after heating form a polyurethane. It is also possible to work up mixtures containing the oxides and a binding agent by calendering or extruding into foils or filaments. (For further details we refer to the book "German Plastics Practice," pages 481–488, by J. M. De Bell, W. C. Goggin, W. C. Gloor, published by De Bell and Richardson, Springfield, Massachusetts, 1946.) The magnetic layer may contain about two to three parts of ferromagnetic oxide to about one part of binding agent. The foils are finally cut into tapes of 6.25 mm. width.

The tapes referred to in the following examples were produced as follows:

3.5 kg. of iron oxide, 0.830 kg. of the polyester put on the market by Farbenfabriken Bayer A.G. under the trade name "Desmophen 1100," 5.6 l. chlorobenzene were milled in a steel ball mill for 24 hours. Thereafter 82 g. of the polyisocyanate put on the market by Farbenfabriken Bayer A.G. under the trade name "Desmodur TH" (75 percent solution) was added per 1 litre of the above mixture. The coating of this solution was carried out in known manner.

*Example 4*

The above coating composition containing the pigment A was coated on a 40μ thick foil of cellulose acetate. The dried layer had a thickness of 10μ. On this layer there was coated a layer of 4μ thickness from the above coating composition containing the pigment B. Furthermore compositions containing pigment A and B respectively were coated separately onto the foil of cellulose-acetate these layers having a thickness of 14μ. The following characteristics were obtained.

| Tape | Stability, db | Maximum reproducing level, db |
|---|---|---|
| 10μ pigment A / 4μ pigment B | 0.1 | 4.3 |
| 14μ pigment A | 0.7 | 5.0 |
| 14μ pigment B | 0 | 0 |

The above values for the reproducing level are relative and are compared with the reproducing level of the tape with pigment B which was assumed to be 0 db.

The "stability" values demonstrate the difference in db between the reproducing levels of the first and the tenth reproduction of the 10 kilohertz tone at a speed of 38 cm. second.

*Example 5*

On a 45μ foil of celluloseacetate there was coated a layer of 12μ thickness with the above coating composition containing the pigment A. Over this layer there was coated a 6μ thick layer with the coating composition containing pigment C. The same coating compositions were coated separately on the same support and layers of 18μ thickness were obtained. The characteristics of these tapes were the following:

| Tape with— | Stability, db | Maximum reproducing level, db |
|---|---|---|
| 12μ pigment A / 6μ pigment C | 0.1 | 4.0 (as compared with pigment C) |
| 18μ pigment A | 0.6 | 4.5 (as compared with pigment C) |
| 18μ pigment C | 0 | 0 |

*Example 6*

The above coating composition containing pigment A and B respectively were mixed in a proportion of 1:1 and thereafter coated on a 45μ celluloseacetate foil to produce a layer of 10μ thickness. Layers of the same thickness were produced with the coating composition containing pigments A and B respectively. The characteristics of these tapes were the following:

| Tape | Stability, db | Maximum reproducing level, db |
|---|---|---|
| 10μ pigment A+B | 0.5 | 3.0 } As compared with pigment B |
| 10μ pigment A | 1.2 | 5.0 } As compared with pigment B |
| 10μ pigment B | 0 | 0 |

From a comparison of the above characteristics it becomes obvious that by the combination of the two types of iron oxide there is obtained substantially more than the arithmetical mean to be expected from the characteristics of the starting oxides.

We claim:

1. A magnetic impulse record member comprising a support and coated on said support two superimposed magnetic recording layers having pulverulent magnetic material dispersed in a non-magnetizable binding agent, the magnetic material of the outer layer being ferromagnetic iron oxide free of cobalt, the magnetic material of the inner layer being a ferromagnetic non-sintered iron-oxide wherein 2.5–4% of the iron atoms are replaced by cobalt, and the outer layer is 4 to 6 microns thick.

2. A magnetic impulse record member according to claim 1, wherein the ferromagnetic oxide of the outer layer is obtained by reducing ferric hydroxide to $Fe_3O_4$ and oxidizing the latter to gamma $Fe_2O_3$.

3. A magnetic impulse record member according to claim 1, wherein the ferromagnetic oxide of the outer layer is obtained by reducing $Fe_2O_3$ to $Fe_3O_4$ and oxidizing the latter to gamma $Fe_2O_3$.

4. A magnetic impulse record member according to claim 1, wherein the magnetic material of the outer layer is present in an amount of 5 to 10 grams per square meter and that of the inner layer in an amount of 15 to 25 grams per square meter.

5. A magnetic impulse record member according to claim 1, wherein the magnetic material of the inner layer has remanence values between 450 and 650 gausses and coercivity values between 250 to 420 oersteds.

References Cited in the file of this patent

UNITED STATES PATENTS

| | | |
|---|---|---|
| 2,463,413 | Neel | Mar. 1, 1949 |
| 2,643,130 | Kornei | June 23, 1953 |
| 2,689,168 | Dovey et al. | Sept. 14, 1954 |
| 2,691,072 | Mathes | Oct. 5, 1954 |

FOREIGN PATENTS

| | | |
|---|---|---|
| 644,639 | Great Britain | Oct. 18, 1950 |
| 717,269 | Great Britain | Oct. 27, 1954 |
| 721,630 | Great Britain | Jan. 12, 1955 |
| 1,107,265 | France | June 25, 1954 |